United States Patent [19]

Kinoshita et al.

[11] 4,005,009

[45] Jan. 25, 1977

[54] METHOD OF TREATING WASTE WATER CONTAINING SURFACTANT AND HEAVY METALS

[75] Inventors: Mototaka Kinoshita, Kashiwa; Yoshimitu Sekiguchi, Ichikawa; Susumu Ando, Chiba, all of Japan

[73] Assignee: Lion Fat & Oil Co., Ltd., Tokyo, Japan

[22] Filed: Mar. 5, 1975

[21] Appl. No.: 555,572

[30] Foreign Application Priority Data

Mar. 14, 1974  Japan .............................. 49-28521

[52] U.S. Cl. .................................. 210/44; 210/51; 210/53; 210/54; 210/DIG. 30
[51] Int. Cl.² ............................................ B03D 1/02
[58] Field of Search .............. 75/108, 109; 210/42, 210/44, 50-54, DIG. 30

[56] References Cited

UNITED STATES PATENTS

| | | | |
|---|---|---|---|
| 629,409 | 4/1899 | Wilson ................................ 210/52 |
| 2,221,018 | 11/1940 | Bachman et al. ................... 210/44 |
| 2,734,821 | 2/1956 | Schaufelberger .................. 74/108 |
| 3,201,304 | 8/1965 | Munjat ............................... 210/54 |
| 3,285,849 | 11/1966 | Watanabe et al. .................. 210/52 |
| 3,404,088 | 10/1968 | Dujardin ............................ 210/44 |
| 3,476,553 | 11/1969 | Sebba et al. ....................... 75/108 |
| 3,898,159 | 8/1975 | Okabe et al. ...................... 210/44 |
| 3,932,274 | 1/1976 | Izumi et al. ....................... 210/54 |

OTHER PUBLICATIONS

Grieves R. B., JWPCF, 42, 1970, pp. R336–R344.

*Primary Examiner*—Charles N. Hart
*Assistant Examiner*—Peter A. Hruskoci
*Attorney, Agent, or Firm*—Woodhams, Blanchard and Flynn

[57] ABSTRACT

A method of treating a waste water containing anionic surfactant and heavy metals, which comprises the steps of: adding a specific inorganic coagulant and a specific salt to said waste water so as to make the respective concentration of said inorganic coagulant and inorganic salt in the waste water be at prescribed levels, adjusting the pH value to be in the range of from 5 to 10 after adding said inorganic coagulant, further adding a cationic coagulant so as to make its concentration be at a prescribed level, and treating the thus processed waste water through the foam separating process.

3 Claims, No Drawings

METHOD OF TREATING WASTE WATER CONTAINING SURFACTANT AND HEAVY METALS

BACKGROUND OF THE INVENTION a. Field of the Invention

The present invention relates to a method of treating a waste water containing anionic surfactant and heavy metals such as cadmium, chromium, manganese, mercury, etc. by applying the foam separating process.

The term 'foam separating process' herein means a process comprising making a foaming agent such as surfactant be present in a waste water and generating foam by introducing air into the waste water so as to make said foam adsorb the coexisting substances as well as said foaming agent contained in the waste water or to make them adhere to said foam, thereby to separate them from the waste water.

b. Description of the Prior Art

The industrial waste waters discharged from metal refinery works, plating shops, metal processing shops, etc. generally contain not only heavy metals such as Cd, Cr, Mn, Hg, etc. in great quantities, but also anionic surface active agents and other surfactants employed for various washing works. To discharge such waste waters without subjecting them to any purification treatment would lead to the destruction of the environment and cannot be tolerated. At present, therefore, these waste waters containing surfactants and heavy metals are usually treated through the flocculation process and the like, but such conventional methods are still insufficient for attaining a satisfactory result.

In this connection, GRIEVES RB, J, Water Pollution Control Federation 42[8(part)2] R336 – R344(1970) reports a method of removing chromium by applying the foam separating process to a chromium-containing waste water. This method comprises the processes of converting chromium contained in the waste water into the hydroxide thereof and adding a surfactant thereto thereby to perform the foam separation. According to this method, however, the chromium-removing efficiency is insufficient and the loss of treating water is great, so that a fully satisfactory result has not been realized.

SUMMARY OF THE INVENTION

The object of the present invention is to provide a method of treating a waste water containing anionic surfactant and heavy metals, which method renders it possible to separate and remove said surfactant and heavy metals efficiently from the waste water by applying the foam separating process. In other words, the present invention is to provide a method of treating a waste water containing anionic surfactant and heavy metals, which comprises the steps of: adding at least one inorganic coagulant selected from the group consisting of aluminum chloride, polyaluminum chloride, aluminum sulfate, ferrous chloride, ferric chloride, ferrous sulfate and ferric sulfate and at least one inorganic salt selected from the group consisting of sodium sulfate, potassium sulfate, ammonium sulfate, sodium chloride, potassium chloride and ammonium chloride to said waste water so as to make the concentration of said inorganic coagulant in the waste water be in the range of from 30 to 1000 ppm and the concentration of said inorganic salt in the waste water be in the range of from 200 to 5000 ppm, adjusting the ph value to be in the range of from 5 to 10 after adding said inorganic coagulant, then adding a cationic coagulant so as to make its concentration in the waste water be in the range of from 1 to 50 ppm, and treating the thus processed waste water through the foam separating process, thereby to collect said surfactant and heavy metals as separated from water.

Said anionic surfactant includes, for instance, alkylbenzene sulfonate, $\alpha$-olefin sulfonate, soap, alcohol sulfate, alcohol ethoxysulfate, etc., which form aggregate substances by reacting with an inorganic coagulant. Said heavy metals include, for instance, Cd, Cr, Mn, Hg and other metals.

In the case where a waste water to be treated contains no anionic surfactant at all or just a modicum thereof, it is necessary to add some anionic surfactant thereto in advance. Therefore, the amount of anionic surfactant to be present in the waste water to be treated, though it somewhat depends upon the amount of heavy metals present in the waste water, is amount in the range of from 1.0 to 20 ppm.

The inorganic coagulant for use in the present invention includes aluminum chloride, polyaluminum chloride, aluminum sulfate, ferrous chloride, ferric chloride, ferrous sulfate and ferric sulfate, and these coagulants may be applied either individually or upon combining two or more of them. When any other coagulant is employed, a desired result cannot be realized.

The appropriate amount of said inorganic coagulant to be added is an amount sufficient for making its concentration in the waste water be in the range of from 30 to 1000 ppm; in the case where the applied amount is so little that its concentration is less than 30 ppm, the effect of forming aggregate substance is insufficient and the heavy-metal removing efficiency will become poor, while in the case where the applied amount is so much that its concentration is in excess of 1000 ppm, it will also have an undesirable influence upon the heavy-metal removing efficiency.

The inorganic salt for use in the present invention includes sodium sulfate, potassium sulfate, ammonium sulfate, sodium chloride, potassium chloride and ammonium chloride, and these salts may be applied either individually or upon combining two or more of them. When any other inorganic salt is employed, a desired result cannot be realized.

The appropriate amount of said inorganic salt to be added is an amount sufficient for making its concentration in the waste water be in the range of from 200 to 5000 ppm; in the case where the applied amount is so little that its concentration is less than 200 ppm, a sufficient removing efficiency cannot be expected, while in the case where the applied amount is so much that its concentration is in excess of 5000 ppm, it will not particularly improve the removing efficiency; it is rather undesirable as it will result in an increase of the remnant of said salt in the treated water.

The order of adding said inorganic coagulant and inorganic salt to the waste water may be optionally determined, but it is absolutely necessary to perform the adjustment of the pH value subsequent to the addition of said inorganic coagulant. Accordingly, it will do to apply either the process of adding the inorganic coagulant to the waste water, adjusting the pH value, adding the inorganic salt and further adding the cationic macromolecular coagulant, in that order, or the process of adding the inorganic salt to the waste water, adding the inorganic coagulant subsequent thereto, adjusting the pH value and further adding the cationic macromolecular coagulant, in that order. The pH value of the waste water is adjusted to be in the range of from 5 to 10; in the case where the pH value is beyond this range, the aggregate substance forming effect is unsatisfactory and a desired removing efficiency cannot be realized. For the purpose of adjusting the pH value, a conventional inorganic pH adjusting agent is employed.

The cationic macromolecular coagulant for use in the present invention includes, for instance, polyacryl amine as well as denatured substances thereof, polyimine, etc. As for the amount of such coagulant to be added, it is effective to apply such an amount as will make its concentration in the waste water be in the range of from 1 to 50 ppm; in the case where the applied amount is so little that its concentration is less than 1 ppm, a sufficient removing efficiency cannot be expected, while in the case where the applied amount is so much that its concentration is in excess of 50 ppm, there will take place the re-dispersion of the aggregate substance and a desired removing efficiency cannot be realized.

The waste water thus made to contain a prescribed amount of various coagulants and inorganic salts is treated by applying the foam separating process. The reaction mechanism in the present invention is yet to be clarified, but the high removing efficiency of the method of the present invention is considered attributable to a synergetic action of the reaction product between surfactant and inorganic coagulant (to wit, the aggregate substance), the inorganic salt and the cationic macromolecular coagulant, which facilitates efficient adsorption of the aggregate substance, surfactants and heavy metals by foams.

The method according to the present invention is suitable for the treatment of the industrial waste waters, particularly waste waters to be discharged from the metal refinery works, plating shops and metal processing shops.

DESCRIPTION OF THE PREFERRED EMBODIMENTS

Example 1

4 l of a waste water with pH 8.2 containing 5 ppm of linear alkylbenzene sodium sulfonate (LAS) and 5 ppm of $Cr^{+6}$ were stocked in a container having a foam oulet, an air inlet provided on the bottom, and a stirrer. After adjusting the pH value of this stock water to be 3.0 and reducing $Cr^{+6}$ to $Cr^{+3}$ by means of sulfuric acid (4.8% aqueous solution), aluminum sulfate was added so as to make its concentration be 100 ppm. Next, after adjusting the pH value to be 8.0 by means of an aqueous solution of caustic soda, by adding sodium sulfate so as to make its concentration be 1000 ppm, further adding polyamine-type SANFLOC C-454 (the manufacture of SANYO KASEI K.K.) as the cationic macromolecular coagulant so as to make its concentration be 10 ppm, and introducing air into the stock at the rate of 3 l/min after stirring it, the foam separating treatment was carried out. After 5 minutes' treatment, the properties of the treated water were measured. The result was as shown in the appended Table-1 wherein the result of the comparative examples and the examples embodying the present invention in the following are shown collectively.

In this connection, the concentration of the surfactant was measured by Abott's method, and as for the heavy metal ions, the measurement was conducted by the use of the atomic absorptiometer.

Comparative Example 1

The same procedures as in Example 1 were repeated without adding aluminum sulfate applied as the inorganic coagulant in Example 1. The result was as shown in Table-1.

Comparative Example 2

The same procedures as in Example 1 were repeated without adding sodium sulfate applied as the inorganic salt in Example 1. The result was as shown in Table-1.

Comparative Example 3

The same procedures as in Example 1 were repeated without adding cationic macromolecular coagulant employed in Example 1. The result was as shown in Table-1.

Comparative Example 4

Except for employing zinc chloride in lieu of aluminum sulfate as the inorganic coagulant, the same procedures as in Example 1 were repeated. The result was as shown in Table-1.

Comparative Example 5

Except for employing ammonium phosphate in lieu of sodium sulfate as the inorganic salt, the same procedures as in Example 1 were repeated. The result was as shown in Table-1.

Comparative Example 6

Except for employing polyacrylic amide-type SANFLOC AA 300 P (the manufacture of SANYO KASEI K.K.) as the anionic macromolecular coagulant in lieu of SANFLOC C-454 as the cationic macromolecular coagulant, the same procedures as in Example 1 were repeated. The result was as shown in Table-1.

Example 2

4 l of a waste water with pH 9.0 containing 10 ppm of α-olefin sodium sulfonate (AOS) having 15 to 18 carbon atoms and 10 ppm of $Cr^{+6}$ were stocked in the same container as that in Example 1. After adjusting the pH value of this stock water to be 3.5 and reducing $Cr^{+6}$ to $Cr^{+3}$ by means of sulfuric acid (4.8% aqueous solution), ferrous chloride was added so as to make its concentration be 100 ppm. Next, after adjusting the pH value to be 8.6 by means of an aqueous solution of caustic soda, by adding sodium chloride so as to make its concentration be 1000 ppm, further adding polyamine-type SANFLOC C-450 (the manufacture of SANYO KASEI K.K.) as the cationic macromolecular coagulant so as to make its concentration be 20 ppm, and applying the same procedures as in Example 1 subsequent thereto, treatment of the stock water was carried out. The result was as shown in Table-1.

Example 3

4 l of a waste water with pH 10 containing 20 ppm of Cd were stocked in the same container as that in Example 1. After adding thereto linear alkylbenzene sulfonate (LAS) so as to make its concentration be 10 ppm, aluminum sulfate so as to make its concentration be 300 ppm and ammonium sulfate so as to make its concentration be 2000 ppm, the pH value was adjusted to be 8.0 by means of sulfuric acid (4.8% aqueous solution). Subsequently, by adding polyamine-type SANFLOC C-454 (the manufacture of SANYO KASEI K.K.) as the cationic macromolecular coagulant so as to make its concentration be 30 ppm, and applying the same procedures as in Example 1 thereafter, treatment of the stock water was carried out. The result was as shown in Table-1.

KOGYO K.K.) as the cationic macromolecular coagulant so as to make its concentration be 5 ppm and applying the same procedures as in Example 1 subsequent thereto, treatment of the stock water was carried out. The result was as shown in Table-1.

Table-1

|  |  | Waste water before treatment | | Waste water after treatment | | |
|---|---|---|---|---|---|---|
|  |  | Concentration of surfactant (ppm) | Concentration of heavy metals (ppm) | Concentration of surfactant in treated water (ppm) | Concentration of heavy metals in treated water (ppm) | Amount of effluent (%) |
| Example | 1 | LAS 5 | Cr 5 | 0.15 | 0.02 | 1.0 |
| Comparative Example | 1 | '' | '' | 1.20 | 2.20 | 4.1 |
|  | 2 | '' | '' | 2.40 | 0.55 | 2.7 |
|  | 3 | '' | '' | 0.80 | 0.90 | 6.5 |
|  | 4 | '' | '' | 0.93 | 1.56 | 1.3 |
|  | 5 | '' | '' | 0.50 | 2.40 | 4.0 |
|  | 6 | '' | '' | 1.20 | 1.20 | 7.0 |
| Example | 2 | AOS 10 | Cr 10 | 0.22 | 0.01 | 0.7 |
|  | 3 | LAS 10 | Cd 20 | 8.32 | 0.01 | 0.5 |
|  | 4 | DBS 5 | Cr 10 | 0.17 | 0.02 | 1.3 |
|  | 5 | AES 10 | Cd 3 | 0.17 | 0.03 | 1.2 |

Example 4

4 l of a waste water with pH 7 containing 5 ppm of dodecylbenzene sodium sulfonate (DBS) and 10 ppm of $Cr^{+6}$ were stocked in the same container as that in Example 1. After adjusting the pH value of this stock water to be 3.0 and reducing $Cr^{+6}$ to $Cr^{+3}$ by means of sulfuric acid (4.8% aqueous solution), polyaluminum chloride was added so as to make its concentration be 100 ppm. Next, after adjusting the pH value to be 8 by means of an aqueous solution of caustic soda, by adding sodium sulfate so as to make its concentration be 5000 ppm, further adding polyamine-type SANFLOC C-454 (the manufacture of SANYO KASEI K.K.) as the cationic macromolecular coagulant so as to make its concentration be 10 ppm, and applying the same procedures as in Example 1 subsequent thereto, treatment of the stock water was carried out. The result was as shown in Table-1.

EXAMPLE 5

4 l of a waste water with pH 3.6 containing 10 ppm of alcohol ethoxysulfate (AES) with 12 carbon atoms and $\bar{p}=3$ and 3 ppm of Cd were stocked in the same container as that in Example 1. After adding thereto aluminum chloride so as to make its concentration be 50 ppm and also adding ammonium chloride so as to make its concentration be 500 ppm, the pH value was adjusted to be 8.6 by means of caustic soda (4% aqueous solution). Next, by adding polyethylene imine-type P-1500 (the manufacture of NIPPON SHOKUBAI

What is claimed is:

1. A method of treating waste water from metal processing operations, said waste water containing from 3 to 20 ppm of heavy metals and from one to 20 ppm of anionic surfactant, which consists essentially of the steps of:
    A. adding to said waste water from 30 to 1000 ppm of at least one inorganic coagulant selected from the group consisting of aluminum chloride, polyaluminum chloride, aluminum sulfate, ferrous chloride, ferric chloride, ferrous sulfate and ferric sulfate, and then adjusting the pH of said waste water to from pH 5 to pH 10, before any further treatment of said waste water, so that the surfactant reacts with said inorganic coagulant, and adding to said waste water from 200 to 5000 ppm of at least one inorganic salt selected from the group consisting of sodium sulfate, potassium sulfate, ammonium sulfate, sodium chloride, potassium chloride and ammonium chloride
    B. after step A, adding to said waste water from one to 50 ppm of a cationic macromolecular coagulant selected from the group consisting of polyamine and polyethylene imine cationic coagulants, and
    C. after step B, blowing air through said waste water to generate a foam so that the foams absorb said surfactant and heavy metals, separating the foam and recovering a treated waste water having a reduced content of said surfactant and heavy metals.

2. A method as claimed in claim 1 in which the pH is adjusted by adding an aqueous solution of caustic soda.

3. A method as claimed in claim 1 in which said anionic surfactant is selected from the group consisting of alkyl benzene sulfonates, α-olefin sulfonates, soaps, alcohol sulfates and alcohol ethoxy sulfates.

* * * * *